United States Patent [19]

Kim et al.

[11] Patent Number: 5,732,201
[45] Date of Patent: Mar. 24, 1998

[54] METHOD FOR DIVISIONALLY UTILIZING MEMORY AREA

[75] Inventors: Hong-Jang Kim, Kyungki-do; In-Koo Kim, Seoul, both of Rep. of Korea

[73] Assignee: SamSung Electronics Co., Ltd., Kyungki-do, Rep. of Korea

[21] Appl. No.: 781,585

[22] Filed: Jan. 9, 1997

[30] Foreign Application Priority Data

Jan. 9, 1996 [KR] Rep. of Korea ............... 96-260

[51] Int. Cl.$^6$ ........................................ G06K 15/00
[52] U.S. Cl. ................................ 395/115; 395/110
[58] Field of Search ............................ 395/101, 110, 395/112, 114, 115, 116, 507, 508, 511, 512, 514, 520, 521, 526, 834, 829, 876, 872; 358/261.4, 444, 404, 470

[56] References Cited

U.S. PATENT DOCUMENTS

| | | |
|---|---|---|
| 5,075,874 | 12/1991 | Steeves et al. ............... 395/112 |
| 5,108,207 | 4/1992 | Isobe et al. ............... 395/115 |
| 5,329,630 | 7/1994 | Baldwin . |
| 5,367,701 | 11/1994 | von Gnechten et al. . |
| 5,428,760 | 6/1995 | Ghori et al. . |
| 5,434,976 | 7/1995 | Tan et al. . |
| 5,566,321 | 10/1996 | Pase et al. . |
| 5,579,508 | 11/1996 | Yoshizawa et al. . |
| 5,584,015 | 12/1996 | Villette et al. . |

*Primary Examiner*—Arthur G. Evans
*Attorney, Agent, or Firm*—Robert E. Bushnell, Esq.

[57] ABSTRACT

A method for divisionally utilizing a memory area may include the steps of setting an input buffer area in the memory, receiving data from a computer, determining whether a user defined character is received, storing data to the input buffer if the user defined character is not received in the above step, determining if a down load flag is set to "0" if the user defined character is received, resetting the memory for the input buffer and down load buffer if the down load flag is set to "0" in the above step, setting the down load flag to "0", and storing data in the down load buffer if the down load flag is not "0".

17 Claims, 2 Drawing Sheets

METHOD FOR DIVISIONALLY UTILIZING MEMORY AREA

CLAIM OF PRIORITY

This application makes reference to, incorporates the same herein, and claims all benefits accruing under 35 U.S.C. §119 from our application entitled *Method For Divisionally Utilizing Memory Area* earlier filed in the Korean Industrial Property Office on 9 Jan. 1996, and there duly assigned Ser. No. 260/1996 by that Office.

BACKGROUND OF THE INVENTION

1. Field of the Invention

The present invention relates generally to a method and apparatus for divisionally utilizing a memory, and more particularly, to a method and apparatus for dividing memory for a necessary usage, thereby expanding the usable area of the memory.

2. Discussion of Related Art

On this matter, exemplars of the contemporary practice in the related art include Villette et al. (U.S. Pat. No. 5,484,015, *Buffer Memory Management Method, Recording Medium, and Computer System Incorporating Same,* Dec. 10, 1996) discussing a buffer memory management method classifying the buffer according to its position relative to a threshold list position. Yoshizawa et al. (U.S. Pat. No. 5,579,508, *Main Memory Managing Method And Apparatus In Which Main Memory Is Partitioned Into Three Distinct Areas,* Nov. 26, 1996) discusses a main memory managing arrangement involving looking into a table which stores head addresses and capacities of the respective areas. Pase et al. (U.S. Pat. No. 5,566,321, *Method Of Managing Distributed Memory Within A Massively Parallel Processing System,* Oct. 15, 1996) discusses a method of managing distributed memory in which a local memory is partitioned into a shared heap segment, a shared stack segment, a private heap segment and a private stack segment. One of the segments starts at a fixed address and grows upward. Tan et al. (U.S. Pat. No. 5,434,976, *Communications Controller Utilizing An External Buffer Memory With Plural Channels Between A Host And Network Interface Operating Independently For Transferring Packets Between Protocol Layers,* Jul. 18, 1995) discusses communications controller utilizing an external buffer memory with plural channels between a host and network interface, operating independently while transferring packets between protocol layers. Ghori et al. (U.S. Pat. No. 5,428,760, *Circuitry And Method For Sharing Internal Microcontroller Memory With An External Processor,* Jun. 27, 1995) discusses methods and circuitries for sharing a memory space of a microcontroller with a processor. The memory space corresponds to a random access memory on a same substrate as the microcontroller, accessible by the microcontroller. Von Gnechten et al. (U.S. Pat. No. 5,367,701, *Partitionable Data Processing System Maintaining Access To All Mainstorage Units After Being Partitioned,* Nov. 22, 1994) discusses a partitionable computing system including main storage units on respective sides of the complex which can be fully controlled and accessible from either side. The system includes a dual port main storage unit design, and a system controller design capable of driving plural main storage unit interfaces. Baldwin (U.S. Pat. No. 5,329,630, *System And Method Using Double-Buffer Preview Mode,* Jul. 12, 1994) discusses a double buffering subsystem, wherein a dual port memory is partitioned in software so that the top half of the memory is allocated to one processor, and the bottom half to the other. From our study of these exemplars of the contemporary practice and of the prior art, we find that there is a need for an effective and improved management method and apparatus that permit increase of memory usage in fields such as, but not limited to, printers.

SUMMARY OF THE INVENTION

Accordingly, the present invention is directed to a method for divisionally utilizing a memory area that substantially obviates one or more of the problems due to limitations and disadvantages of the related art.

It is an object of the present invention to provide an improved method and apparatus for divisionally using a memory.

It is another object to provide an improved method and apparatus for a printer having a memory management.

It is still another object to provide a method and apparatus for initially using a memory for an input buffer and subsequently for a down load buffer.

It is a further object to provide a method and apparatus for expanding the memory area by initially using a memory is used for an input buffer initially and used for a down load buffer by dividing a predetermined portion of the input buffer only when a specific code made of a user defined character is sensed.

In order to achieve one or more of the above objects, the present invention provides a method for divisionally utilizing a memory area by setting an input buffer area in the memory, receiving data from a computer, determining if a user defined character is received, and storing data to the input buffer if the user defined character is not received in the above step. The method may also include determining if a down load flag is set to "0" if the user defined character is received, resetting the memory for the input buffer and down load buffer if the down load flag is set to "0" in the above step, setting the down load flag to "0", and storing data in the down load buffer.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a block diagram of printer of a preferred embodiment, built according to the principles of the present invention; and FIG. 2 is a flowchart of a control sequence of the printer according to FIG. 1.

DETAILED DESCRIPTION OF PREFERRED EMBODIMENT

Reference will now be made in detail to the preferred embodiments of the present invention, examples of which are illustrated in the accompanying drawings.

In order to give an example, a printer is presented as an embodiment of the invention. In a printer of a contemporary practice, a down load RAM or an additional RAM such as a dip switch or a non-volatile RAM is mounted in order to store a user defined character. The RAM selectively used for an input buffer or a down load buffer. When using this method, the down load RAM is secured for the user defined character fixed to be used for a specific period of time (typically a short time) from the moment the printer begins to be operated. Accordingly, the fixed memory area is used divisionally, and thus the memory area of the input buffer is proportionally decreased. This is a concern.

Figure 1:
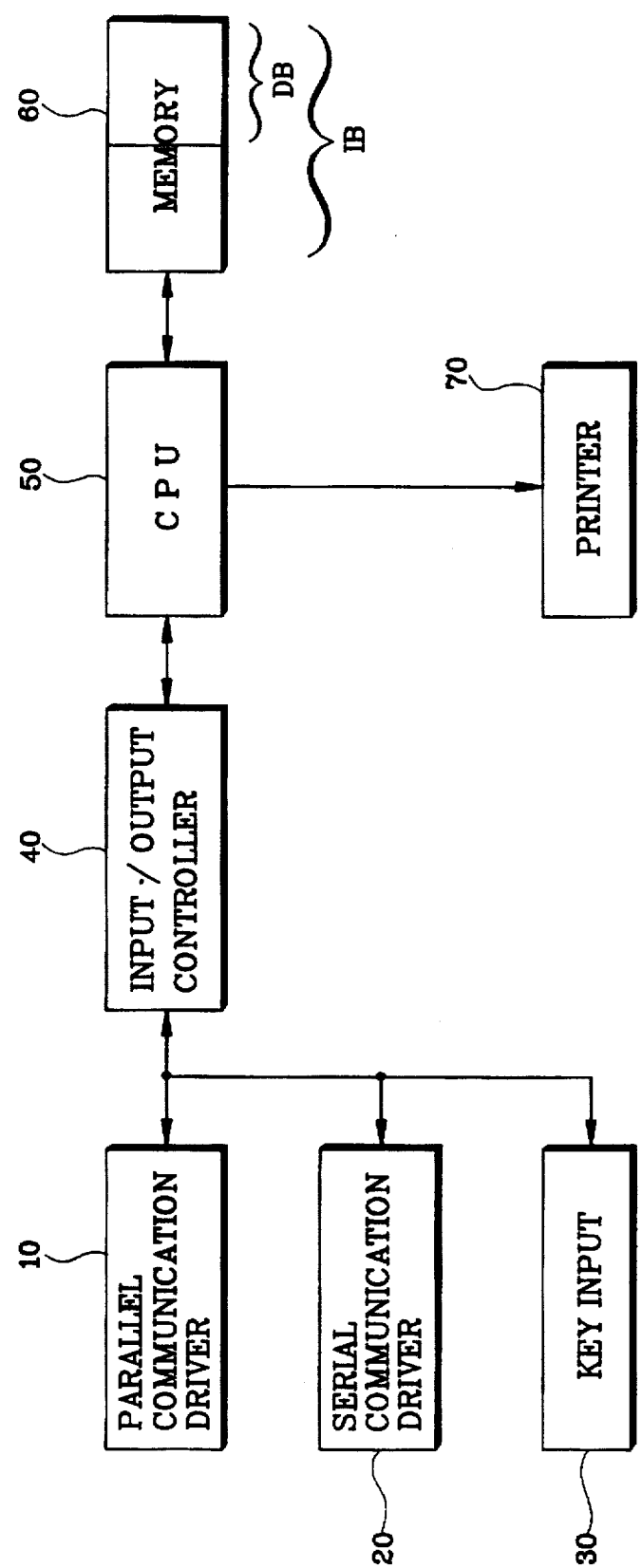
Figure 2:
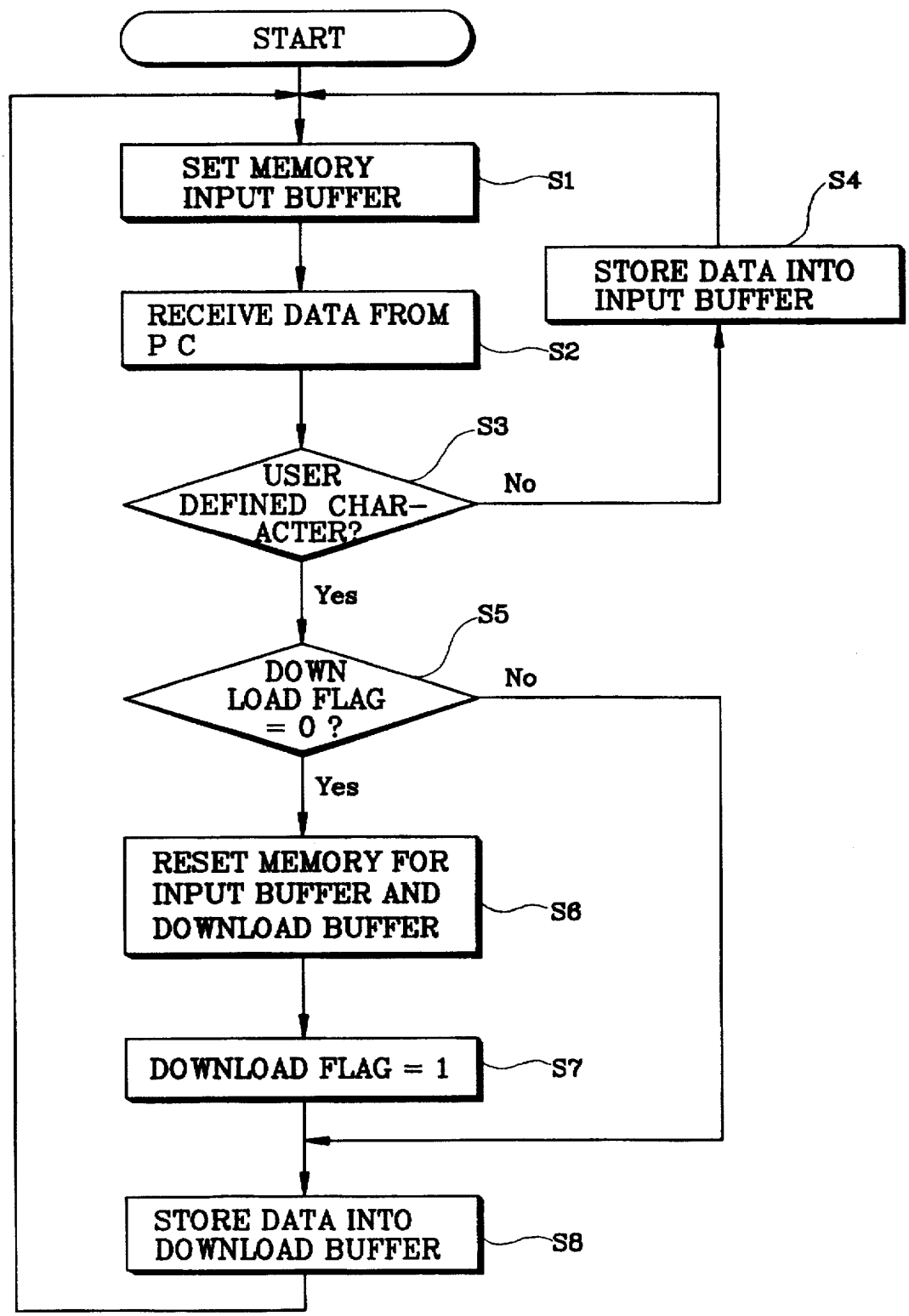

As illustrated in FIG. 1, the invention is applied to a printer. The printer may include one or more of the following: parallel and serial communication drivers 10 and 20 for receiving data output from a computer; a key input part 30 for inputting a predetermined control command to a printer; and an input and output controller 40 for controlling an input/output of the signal input through the parallel communication driver 10, serial communication driver 20 and a key input part 30. The printer can include CPU 50 for controlling to initially set a memory area for an input buffer (IB) area, and to set a predetermined portion of the IB fixed in a memory 60 for a down load buffer (DB) area if a specific code with respect to a user defined character is included in the signal output from the input and output controller 40; a memory 60 used for the initially fixed IB by dividing the DB; and a printer 70 for performing a printing operation by an output of CPU 50. The memory 60 is suitable for having memory areas and for supporting memory segments.

The IB for the memory is set in step S1. Data is received from a computer PC in step S2. After determining if the user defined character is received in step S3 and storing data to the IB if the user defined character is not received in the above step in step S4, the apparatus determines if a down load flag is set to "0" if the user defined character is received in step S5. After resetting the memory for the input buffer and down load buffer in step S6 if the down load flag is set to "0" in the above step and setting the down load flag to "0" in step S7, and the apparatus stores data in the DB if the down load flag is not "0" in the step S5 or after the step S7 is performed.

The operation of thus structured invention can be as follows. When power is applied to the printer (printer turns on), CPU 50 sends a predetermined output to set the IB. Then, the down load buffer in which the user defined character is stored is added to the IB. Until the specific code with respect to the user defined character is received, the entire memory 60 is used for the IB in steps S1 through S4. The user defined character is output from the computer through the parallel communication driver 10 or the serial communication driver 20. If the specific code indicating the user defined character is input from the computer, CPU 50 determines if the code with respect to the user defined character is previously received. If the user defined character is received for the first time, a predetermined portion of the IB of the memory 60 is set divisionally for the DB so that the structure of the memory 60 is reset. During the state in which power is applied, the division of the memory 60 is maintained continuously.

In order to prevent the DB area from being reset to the memory 60, the down load flag is set to "1" and the received user defined character is stored in the DB. If the user defined character is not received for the first time, the setup operation is not performed. In such a situation, only the data of the user defined character is stored in DB in steps S5 through S8.

As described above, the invention does not always use a predetermined portion of the memory for the user defined character from the beginning, but uses the download buffer (DB) by setting it only when the code with respect to the user defined character is input—thus variedly setting it. Thus, this expands the usage area of the memory.

It will be apparent to those skilled in the art that various modifications and variations can be made in a method for divisionally utilizing the memory area of the present invention without departing from the spirit or scope of the invention. Thus, it is intended that the present invention cover the modifications and variations of this invention provided they come within the scope of the appended claims and their equivalents.

What is claimed is:

1. A printing method, comprising the steps of:

receiving printing data through a serial communication driver and a parallel communication driver;

receiving a user defined character, through a key input part, the user defined character indicating a predetermined storage function;

dividing a memory of a printing system into first, second and a shared memory segment;

setting the first memory segment as an input buffer area;

setting the second memory segment as a download buffer area;

setting the shared memory segment both as the input buffer area and as the download buffer area;

receiving computer data from a computer system having a processing element and a network;

determining whether the user defined character is received;

when the user defined character is determined to have been not received, storing the computer data to the input buffer;

when the user defined character is determined to have been received, determining whether a down load flag is set;

when the down load flag is determined to have been not set, resetting the memory the first memory segment, the second memory segment, and the shared memory segment, and storing the computer data in the down load buffer;

setting the down load flag; and printing a portion of the computer data.

2. The method of claim 1, further comprising the step of storing data in the down load buffer after the down load flag is set.

3. The method of claim 1, with the down load flag being set as "0."

4. The method of claim 1, with the first memory segment, the second memory segment, and the shared memory segment not overlapping with each other.

5. The method of claim 1, with the shared memory segment being a predetermined portion of the first memory segment.

6. The method of claim 2, with the first memory segment, the second memory segment, and the shared memory segment not overlapping with each other.

7. The method of claim 2, with the second memory segment overlapping with the shared memory segment.

8. A network, comprising:

a parallel communication driver for transmitting print data comprising a character defined by a user;

a serial communication driver for transmitting the print data comprising the character defined by the user;

a key input part permitting a manual input by the user of a predetermined control command;

an input and output controller controlling transmission of the print data via said parallel communication driver, said serial communication driver, and said key input part, said input and output controller generating a control signal whenever said character defined by the user is received;

a memory divisable into a plurality of memory segments;

a central processing unit initially using a first of said memory segments as an input buffer for said print data and, in response to a first generation of said control signal by said input and output controller, maintaining a portion of said input buffer as a down-load buffer for storing said print data during continuous application of electrical energy to said central processing unit; and a printer operationally coupled to said central processing unit to print visible images represented by said print data stored within said down-load buffer under control of said central processing unit.

9. The network of claim 8, with said memory segments not overlapping.

10. The network of claim 8, with said memory segments overlapping.

11. A memory management method, comprising the steps of:

dividing a memory of a printing system into first, second and a shared memory segment;

setting the first memory segment as an input buffer area;

setting the second memory segment as a download buffer area;

setting the shared memory segment both as the input buffer area and as the download buffer area;

receiving computer data from a computer system having a processing element and a network;

determining whether a user defined character is received, the user defined character indicating a predetermined storage function;

when the user defined character is determined to have been not received, storing the computer data to the input buffer;

when the user defined character is determined to have been received, determining whether a down load flag is set;

when the down load flag is determined to have been not set, resetting the memory the first memory segment, the second memory segment, and the shared memory segment, and storing the computer data in the down load buffer; and setting the down load flag.

12. The method of claim 11, further comprising the step of storing data in the down load buffer after the down load flag is set.

13. The method of claim 11, with the down load flag being set as "0."

14. The method of claim 11, with the first memory segment, the second memory segment, and the shared memory segment not overlapping with each other.

15. The method of claim 11, with the second memory segment overlapping with the shared memory segment.

16. The method of claim 12, with the first memory segment, the second memory segment, and the shared memory segment not overlapping with each other.

17. The method of claim 12, with the second memory segment overlapping with the shared memory segment.

* * * * *